INVENTOR
GERALD RABOW
BY Philip M. Bolton
ATTORNEY

INVENTOR
GERALD RABOW
BY Philip M. Bolton
ATTORNEY

INVENTOR.
GERALD RABOW
BY Philip M. Bolton
ATTORNEY

MULTILEVEL CODED COMMUNICATION SYSTEM EMPLOYING FREQUENCY-EXPANDING CODE CONVERSION

Filed May 21, 1964

INVENTOR.
GERALD RABOW
BY Philip M. Bolton
ATTORNEY

INVENTOR.
GERALD RABOW
BY Philip M. Bolton
ATTORNEY

INVENTOR.
GERALD RABOW
BY Philip M. Bolton
ATTORNEY

Aug. 20, 1968 G. RABOW 3,398,239

MULTILEVEL CODED COMMUNICATION SYSTEM EMPLOYING FREQUENCY-EXPANDING CODE CONVERSION

Filed May 21, 1964 7 Sheets-Sheet 7

INVENTOR.
GERALD RABOW
BY Philip M. Bolton
ATTORNEY

United States Patent Office 3,398,239

Patented Aug. 20, 1968

3,398,239

MULTILEVEL CODED COMMUNICATION SYSTEM EMPLOYING FREQUENCY-EXPANDING CODE CONVERSION

Gerald Rabow, Nutley, N.J., assignor to International Telephone and Telegraph Corporation, Nutley, N.J., a corporation of Maryland

Filed May 21, 1964, Ser. No. 369,234

24 Claims. (Cl. 178—66)

ABSTRACT OF THE DISCLOSURE

First binary signals capable of representing 16 amplitude levels having an information bandwidth less than the transmission bandwidth are translated to second binary signals capable of representing 64 amplitude levels having an information bandwidth adjusted to fully occupy the transmission bandwidth. Each of the second binary signals are represented by a different signal having a predetermined frequency and phase which is transmitted. The transmitter signal is detected and translated to binary signals for utilization identical to the first binary signals.

This invention relates to communication systems and more particularly to communication systems applicable to satellite and the like communication systems.

The communication system of this invention is particularly applied to those systems having the following characteristics: (1) a minimum required transmitter power; (2) the radio frequency transmission bandwidth appreciably greater than the information bandwidth; (3) a given output signal-to-noise ratio appreciably greater than unity, and (4) a transmission path or channel having a Gaussian noise of uniform density.

Various communication schemes have been proposed for application to such systems including amplitude modulation, frequency modulation with or without frequency feedback in the detector, and pulse code modulation. All of these systems have failed to meet at least one of the above characteristics, that is, they use less than the transmission bandwidth, use more power than needed, and/or employ a coding arrangement utilizing infinitely long code sequences for the message (redundancy codes). The latter coding technique has practical difficulties including coding, detecting and decoding long sequences, since little is presently known of what good code sequences are for this purpose.

An object of this invention is the provision of a communication system wherein the information bandwidth occupies the transmission bandwidth.

Another object of this invention is to utilize code sequences which are limited to those of short length to permit optimum use of frequency coding dimensions.

Still another object of this invention is the provision of a communication system wherein the information bandwidth occupies the transmission bandwidth and simultaneously provides the specified output signal-to-noise ratio.

A further object of this invention is the provision of a communication system simultaneously requiring minimum transmitter power, adjusting the information bandwidth to occupy the transmission bandwidth, and to meet the given output signal-to-noise ratio.

A feature of this invention is a communication system having a given transmission bandwidth comprising a source of signals representing M possible amplitude levels having a given information bandwidth, first means coupled to the source to translate M level signals to signals representing M′ possible amplitude levels having an information bandwidth adjusted to fully occupy the given transmission bandwidth, second means coupled to the first means to transmit M′ level signals, third means coupled to the second means to detect the M′ level signals, and fourth means coupled to the third means to translate the M′ level signals to the M level signals.

An additional feature of this invention is a communication system providing a given transmission bandwidth in which the source of digital signals represents M possible amplitude levels within a given information bandwidth less than the given transmission bandwidth including a first means coupled to the source to translate M level signals to signals repersenting M′ possible amplitude levels having an information bandwidth expanded to fully occupy the given transmission bandwidth, second means coupled to the first means to transmit the M′ level signals, third means coupled to the second means to detect the M′ level signals, and fourth means coupled to the third means to translate the M′ level signals to the M level signals.

Another feature of this invention is the choosing of the value of the M level signals to provide simultaneously the desired output signal-to-noise ratio and to adjust the information bandwidth of the M level signals to occupy the given transmission bandwidth.

Still another feature of this invention is the choosing of the value of the M level signal to provide simultaneously the desired output signal-to-noise ratio, to provide minimum transmitter power, and to adjust the information bandwidth of the M level signals to occupy the given transmission bandwidth.

Another additional feature of this invention is that the M′ level signals are digital in nature and are transmitted over a selected one of a predetermined plurality of channels which may take the form of frequency channels, orthogonal frequency channels, bi-orthogonal frequency channels, time channels, or the like.

A further feature of this invention is the utilization of the bi-orthogonal frequency channels, one of which is selected to transmit the M′ level signal to a distant receiver.

Still a further feature of this invention is the provision of a maximum likelihood detector in conjunction with the bi-orthogonal frequency channels to detect which of these bi-orthogonal frequency channels contains the M′ level signal.

The above-mentioned and other features and objects of this invention will become more apparent by reference to the following description taken in conjunction with the accompanying drawings, in which.

Figures 1, 2, 3:
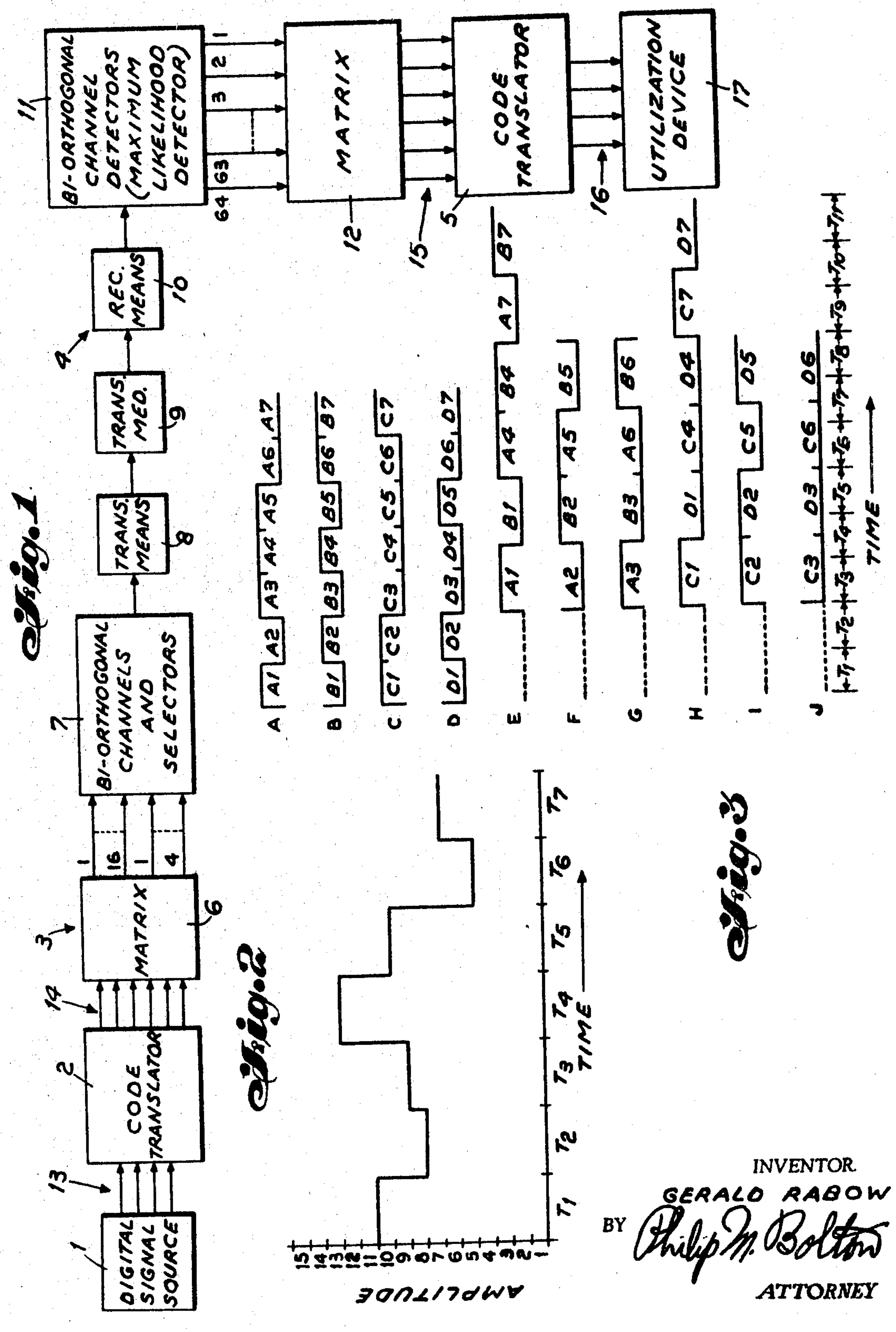
FIG. 1 is a schematic diagram in block form illustrating in general a communication system in accordance with the principles of this invention.
FIGS. 2 and 3 are curves employed to more fully understand the operation of the system of FIG. 1.

Before describing in detail the system of this invention and an embodiment thereof, it is worthwhile to investigate the theoretical possibility according to Shannon's formulas. A signal of information bandwidth $W_o$ and a signal to Gaussian noise power ratio $P_o$ contains an information rate $I=W_o \log_2 (1+P_o)$. This information can be transmitted over a channel or transmission path having a transmission bandwidth $BW_o$ with a signal to Gaussian noise power ratio $P_c/B$, if $P_c$ is equal to or greater than its value given by $$I=BW_o \log_2 \left(1+\frac{P_c}{B}\right)$$

Typically, $BW_o$ is greater than $W_o$. B can further be defined as the ratio of the total transmission bandwidth available to the intelligence bandwidth required for the transmission of one digital pulse.

Eliminating $I/W_o$ in the above equations and solving for the ratio of required signal power to noise power in the information bandwidth yields $$P_c=B[(1+P_o)^{1/B}-1]$$

Note that for $B\rightarrow\infty, P_c\rightarrow \log_e (1+P_o)$.

Let us now focus attention on a system which requires the transmission of a choice of one of M symbols at a rate $2W_o$. Such a signal has an information rate of $2W_o \log_2 M=W_o \log_2 M^2$. An optimally coded signal with Gaussian noise will have the same information rate for $1+P'_o=M^2$ and in this sense a quantized signal may be considered as equivalent to one having a signal-to-noise power ratio $P'_o=M^2-1$. Let us further establish arbitrarily a threshold criterion, namely, that the noise $P'_o$ due to quantization be equal to the noise due to imperfect transmission. The overall signal-to-noise power is then $$P_o=\tfrac{1}{2}P'_o=\frac{M^2-1}{2}$$

which will provide the following equation.

$$M=\sqrt{2P_o+1} \qquad (2)$$

to establish an output signal-to-noise ratio of $P_o$. It should be noted that the above analysis was based on an arbitrary threshold criterion and that a similar analysis can be made for any other threshold criterion.

The preceding has been a theoretical consideration of the problem involved in the present application. We now turn to the practical problem, namely how to transmit $M=\sqrt{2P_o+1}$ level signal of bandwidth $W_o$ through a channel or transmission path of bandwidth $BW_o$ with the output signal-to-noise power (apart from that caused by quantization) $P'_o=2P_o$ so that minimum transmitted power $P_c$ is required. In theory, the M level signal can be transmitted without error if the channel capacity $$BW_o \log_2 \left(1+\frac{P_c}{B}\right)$$

is equal to or greater than $W_o \log_2 (2P_o+1)$, but this requires coding the message into infinitely long sequences. Besides the practical difficulties of coding, detecting and decoding long sequences little is presently known of what good sequences can be used for this purpose. For this reason, code sequences will be limited to those of short length, say of the order of $\log_2 2M$ or less. The limitation on coding in time leaves coding in frequency where the following coding process is proposed in accordance with the principles of this invention of making the optimum use of the frequency coding dimension.

Coherent detection is assumed in the following, that is, two samples can be transmitted per unit bandwidth per unit time. The simplest example of such a system is the use of inphase and quadrature channels of each of B frequency channels, but any other set of 2B orthogonal channels could be used. If non-coherent detection is used, the formulas given below must be modified accordingly.

$$M=4B \qquad (a)$$

In this case digital frequency modulation (FM) can be employed directly, with each of the M symbols represented as a positive or negative signal in one of the 2B orthogonal channels.

$$\log_2 M\leq 2B \qquad (b)$$

Modulation scheme (a) can still be obtained if the M level, $W_o$ bandwidth signal is recoded into M' levels, W' bandwidth signal such that $W_o \log_2 M=W' \log_2 M'$, where $$M'=4B\frac{W_o}{W'}=4B' \qquad (c)$$

Eliminating W' we obtain $$\frac{M'}{\log_2 M'}=\frac{4B}{\log_2 M} \qquad (3)$$

For example, if $M=256$, $B=8$; $\log M=8<2B=16$.

Solving Equation 3 for M' we obtain $M'=16$. This means that each 256 level symbol should be replaced by two 16 level symbols. This doubles the required information bandwidth, reducing B' to 4. Now $M=4B'$ which represents synchronous digital FM.

On the other hand, if $\log M=2B$, then Equation 3 yields the solution $M'=2$ or 4 which corresponds to binary pulse code modulation. For $B<\tfrac{1}{2} \log_2 M$, since M' cannot be reduced below 2, the only way to maintain a signal of information content W $\log_2$ M is to abandon the requirement of orthogonal waveshapes and, as one possibility, transmit each band with L distinct amplitude levels, with consequent increase in required $P_c$. If $B=\tfrac{1}{2}$, the system reduces to coherent amplitude modulation.

The required $P_c$ can now be calculated for any given $P_o$ and B.

A few approximations will simplify this procedure.

First, consider the M symbol error rate $E_M$. The order of magnitude relation between $E_M$ and $P'_o$ is $$\frac{1}{P'_o}\approx\tfrac{1}{2}E_M \text{ or } E_M\approx\frac{2}{P'_o}=\frac{1}{P_o} \left(\text{For } M=2, E_M=\frac{1}{P'_o}\right)$$

The required M' symbol error rate is of the same order of magnitude as the required M symbol error rate. For $M'\gg M$, an error in the M' symbol will likely affect each corresponding M symbol, while for $M\ll M'$, only the M' symbol which determines the most significant portion of the M symbol is important in generating noise. Hence, the required M' symbol rate is $$E_{M'}\approx\frac{1}{P_o} \qquad (4)$$

The quantity $$Q=\frac{\text{Signal energy/bit}}{\text{noise power/unit bandwidth}}$$

can be obtained from the previously calculated plots of $E_M$, vs. Q for various lengths bi-orthogonal codes. See, for example, FIG. 6 of A. J. Viterbi, "On Coded Phase-Coherent Communications", IRE Transactions on Space Electronics and Telemetry, March 1961, pp. 3–14, where M' is equivalent to the code length. Finally, Q must be multiplied by $\log_2 M^2$ to change signal energy per bit to signal energy per $M^2$ symbol, hence $$P_c=2Q \log_2 M \qquad (5)$$

Note that for $B\rightarrow\infty$, $M'\rightarrow\infty$, $Q\rightarrow \log_e 2$ and $$P_c\rightarrow \log_e M^2=\log_e [1+2 P_o].$$

This differs from Equation 1 by the number 2 in front of $P_o$, which resulted from the threshold assumptions.

To illustrate the applicability of the equations set forth hereinabove, a few examples will be given.

Example 1:

$$P_o=100, B=10$$

From (1), $$P_{c\ min}=10(101^{1/10}-1)=5.85$$

From (2), $$M=\sqrt{200+1}=14.2\cong 14$$

From (3), $$\frac{M'}{\log_2 M'}=\frac{4\times 10}{3.8}=10.5$$

$$\therefore M'=64$$

From (4), $$E_{M'}=1/100$$

From curve of Q vs $E_{M'}$ in the above cited reference of Viterbi for bi-orthogonal code of length $64=2^6$, $Q=2.0$ From (5), $$P_c=2\times 2.0\times \log_2 14.2=15.2$$

$$P_c/P_{c\ min}=\frac{15.2}{5.85}=2.6$$

The following is a Table indicating other examples which are derived following the procedure of Example 1.

| | $P_o$=100, $B$=100 | $P_o$=10,000, $B$=100 | $P_o$=10,000, $B$=10 |
|---|---|---|---|
| $P_{c\ min}$ | 4.72 | 9.63 | 15.1 |
| M | 14 | 141 | 141 |
| M′ | 1,050 | 500 | 27 |
| $E_{M'}$ | $10^{-2}$ | $10^{-4}$ | $10^{-4}$ |
| Q | 1.6 | 2.8 | 4.2 |
| $P_c$ | 12.2 | 40 | 60 |
| $P_c/P_{c\ min}$ | 2.6 | 4.2 | 4.0 |

Referring to FIG. 1, a communication system in accordance with the principles of this invention is disclosed including a source of signals 1, such as digital signals, having M possible amplitude levels with a given information bandwidth less than the transmission bandwidth of the system, a first means, such as code translator 2 coupled to source 1 to translate the M level signals to signals, such as digital signals, representing M′ possible amplitude levels having an information bandwidth expanded to fully occupy the given transmission bandwidth of the system, means 3 coupled to translator 2 to transmit the M′ level signals, means 4 to detect the M′ level signals, and a means, such as translator 5, to translate M′ level signals to M level signals.

It is understood that the signal or source 1 may originally be an analog signal which would necessitate an analog-to-digital converter in source 1 to provide at the output thereof the digits for the M level digital signal. The outputs from source 1 provide parallel digit outputs which are coupled to translator 2 to convert the digital signal from an M level stream to an M′ level stream at the output of translator 2 as given by Equation 3. Code translator 2 is a logic network. In certain instances, it may be assumed that M and M′ are related by $M^{1/A}=(M')^{1/B}$, where A and B are positive intergers. The M level signal can be represented by A digits to the base $M^{1/A}$ and M′ level signal by B digits of the same base. Then the M level signal at the input of translator 2 of 3 (base $M^{1/A}$) digits is converted by translator 2 and presented to the output in groups of B digits. For example, if $M=100$ and $M'=1000$, M can be represented by 2 decimal digits and M′ can be represented by groups of 3 decimal digits.

In order to keep A and B reasonably small it may be necessary to modify the values of M and M′ as calculated from Equations 1 and 3 slightly. To illustrate, the values of M and M′ calculated in the example set forth hereinabove could be modified as follows:

| Original | | Modified | | | |
|---|---|---|---|---|---|
| M | M′ | M | M′ | A | B |
| 14 | 64 | 16 | 64 | 2 | 3 |
| 14 | 1,050 | 16 | 1,024 | 2 | 5 |
| 141 | 500 | 128 | 512 | 7 | 9 |
| 141 | 27 | 125 | 25 | 3 | 2 |
| 141 | 2 | 128 | 2 | 7 | 1 |

While more complicated coding schemes could be devised to more nearly achieve the original calculated M and M′, the difference in system performance will probably not usually justify the increased complexity of more complicated coding devices especially in view of the arbitrary threshold assumption.

The output of translator 2 is coupled to means 3 which includes matrix 6, bi-orthogonal channels and selector 7, and transmitter means 8 to channel the transmitted energy into the desired one of M′ possible bi-orthogonal channels during each time period. The output from transmitter means 8, after being corrupted by noise in the transmission medium 9, goes to means 4 which includes receiver 10 to receive the corrupted signal at the output of means 8 and maximum likelihood detector 11. Detector 11, also called a bi-orthogonal channel detector, synchronously detects the signal in each of the bi-orthogonal channels, decides which of the channels has the largest output and whether this output is positive or negative. This results in an output which is the chosen one of the M′ possible symbols. Matrix 12 coupled to the output of detector 11 couples the resultant output to translator 5 which performs an operation which is the inverse of translator 2, thereby reproducing the signal of M possible levels.

The discussion herein relating to channels being of the bi-orthogonal frequency type is a non-limiting example of the operation of the communication system of this invention, and it should be understood that frequency channels, orthogonal frequency channels, and time channels and the like, as well as bi-orthogonal frequency channels, can be employed to transmit M′ level signals through transmission medium 9 to receiving means 10 from transmission means 8.

For complete understanding of the operation of the system of this invention, and the embodiment disclosed herein, let us assume $M=16$ and $M'=64$. It will further be assumed that an analog input signal, as illustrated in FIG. 2, is coupled to the input of source 1 and results in the digital signals shown in curves A, B, C, and D of FIG. 3 in the identical time intervals. In other words, the level 10 of FIG. 2 in time interval $T_1$ is represented by the binary digital signals $A_1$, $B_1$, $C_1$ and $D_1$, since for a binary digital signal four digits will represent the 16 possible amplitude levels.

It will be noted that the digit signals representing a particular analog level are simultaneously coupled to translator 2 on parallel lines 13 at a rate of one per time interval. The parallel output of translator 2 represented by conductors 14 are six digit outputs at a rate of one per 1½ unit time intervals, each set representing a six bit number or, in other words, the number represented by one of the possible M′ levels.

In addition, let us assume that the rate of information transmission is 4 bits/unit time and that one unit time interval requires an intelligence bandwidth of 4 mc. (megacycles). Thus, since in the above example $M=16$, 4 intelligence channels are required of 4 mc. each resulting in a total intelligence bandwidth of 16 mc. It may further be assumed that the transmission bandwidth is 45 mc. Thus, if we translate the number of signal levels from $M=16$ to $M'=64$, the power required for transmission through the transmission path may be reduced. The reasoning for this is as follows. If the time interval for the transmission of each bit is increased, the bandwidth required for the transmission of that bit will be decreased, since the bandwidth is inversely proportional to the duration of the transmitted pulses. If the bandwidth is reduced, less power is required to transmit the pulse. This is due to the fact that less radio frequency noise is generated when the bandwidth is reduced.

Since the information rate is specified, the units of time must be such as to maintain this information rate. Thus, if each unit of time for each bit of source 1 is widened 1½ units of time, the information rate is 6 bits/new time interval. As described, translator 2 translates the unit time of each of the four bits to six bits, each having 1½ time units which results in maintaining the original information rate of 4 bits/unit time. In addition to maintaining the same information rate at the input and output of translator 2, a much greater portion of the available transmission or radio frequency bandwidth is utilized resulting in a minimized transmitting power. This can be demonstrated by the following. For the 16 transmitting channels or transmitted frequencies assumed below, each of these channels now requires ⅔ of the bandwidth of the original four channels, that is, instead of a total bandwidth of $4W_o$ being utilized, a total bandwidth of $$16\times 2/3W_o \text{ or } \frac{32}{3}W_o$$

is utilized, where $W_o$ equals the bandwidth required for the transmission of one of the original digits, in this example, 4 mc. Thus, the system of this invention now utilizes an intelligence bandwidth of $$\frac{32}{3}\times 4=\frac{128}{3}=42\ 2/3 \text{ mc.}$$

Continuing with the brief description of the system of this invention, translator 2 may operate by reading the first pulse ($A_1$,$B_1$) on the first two lines 13, such as those shown in curves A and B of FIG. 3, into the first conductor 14, such as shown in curve E, FIG. 3, in a time interval of three units. The second pulse on the first two line conductors 13, such as $A_2$ and $B_2$, are then read into the second conductor 14, such as shown in curve F, FIG. 3, in the same three unit time interval. The third pulses on the first two conductors 13 are also read into the third conductor of conductor 14, such as indicated by $A_3$ and $B_3$, as illustrated in curve G. The same process is repeated every three time units and also translates the signals on the last two conductors 13, curves C and D of FIG. 3, to the last three conductors 14, curves H, I and J of FIG. 3.

For each 1½ unit time interval the six digit number of FIG. 3, such as illustrated in curves E through J, selects one of the bi-orthogonal channels in source 7 through means of matrix 6. One example of the 64 bi-orthogonal channels is four phases (0°, 90°, 180° and 270°) on each of 16 frequencies.

The output of selector 7 is coupled to transmitter means 8 perturbed by noise in medium 9, and received in receiver means 10. The output of means 10 is coupled to bi-orthogonal channel detectors 11 which is a maximum likelihood detector including 32 phase sensitive detectors which have respectively the 0° and 90° phases of the 16 frequencies as references. A logic circuit decides which of the 32 phase sensitive detectors has the largest absolute output at the end of the 1½ unit time interval and whether the output is positive or negative and presents this in the form of curves E through J of FIG. 3 to translator 5 through matrix 12. All signals in the detectors 11 are removed and the process is repeated for the following 1½ unit time interval. The signal at the input of translator 5, in the form of a six digit number, is converted into that signal illustrated in curves A through D of FIG. 3 by means of translator 5, a four digit binary number having a possible amplitude of M, in this instance, 16. The operation of translator 5 is the inverse of translator 2, wherein the odd pulses $A_1$, $A_2$, $A_3$, $A_4$, $A_5$, $A_6$ on the first three conductors of conductors 15 are presented to the first conductor of conductors 16, the even pulses $B_1$, $B_2$, $B_3$, $B_4$, $B_5$, $B_6$, on the first three conductors of conductors 15 are presented to the second conductor of conductors 16, the odd pulses $C_1$, $C_2$, $C_3$, $C_4$, $C_5$, $C_6$, on the last three conductors of conductors 15 are presented to the third conductor of conductors 16, and the even pulses $D_1$, $D_2$, $D_3$, $D_4$, $D_5$, $D_6$, on the last three conductors of conductors 15 are presented to the last conductor of conductor 16. This resultant output from translator 5 is then presented to a utilization device 17 wherein the digital signal can be restored to its analog form and, in this instance, in accordance with this example, can be converted into a 16 level analog signal as illustrated in FIG. 2.

Digital source 1 provides four outputs 13*a* through 13*d* and it will be described hereinbelow how these four digital outputs representing the M level digital signal can be translated to a six digit output representing an M' level signal. Consider first the digit output of conductor 13*a* as shown in curve A, FIG. 5. It will be observed that this curve A, FIG. 5, identical to curve A, FIG. 3, is applied to shift register 18 which has also applied thereto a timing signal $P_1$ supplied from the clock 19 as illustrated in curve B, FIG. 5. It will be observed that the phase of the signals of curve A and curve B places the timing signal $P_1$ slightly before the transitions of the signals of curve A. Under the operation of timing signal $P_1$, there is shifted to the output of register 18 the signal illustrated in curve C, FIG. 5, which is applied to the input of shift register 20 which is also under control of the timing pulse $P_1$ supplying at the output of register 20 the signal illustrated in curve D, FIG. 5. This output of register 20 is applied to AND gate 21 which under control of the timing pulse $P_2$, as illustrated in curve E, FIG. 5, produces an output as illustrated in curve F, FIG. 5, which in turn is coupled to the OR gate 22. Conductor 13*b* provides at the input of shift register 23 the signal illustrated in curve G, FIG. 5, which is identical to curve B, FIG. 3. Shift register 23 is under control of the timing pulse $P_1$ and provides an output as illustrated in curve H, FIG. 5. This output is then coupled to shift register 24 which under control of the timing pulse $P_1$ produces an output as illustrated in curve I, FIG. 5, which output is then coupled to shift register 25 which is under control of the timing pulse $P_2$ to produce an output as illustrated in curve J, FIG. 5. The output from shift register 25 is coupled to AND gate 26 under control of timing pulse $P_3$ as illustrated in curve K, FIG. 5 to produce an output as illustrated in curve L, FIG. 5. The output of AND gate 26 is coupled to OR gate 22 whose output is coupled to shift register 27 which is under control of both the timing pulses $P_2$ and $P_3$ through OR gate 28. Considering the signals illustrated in curve M and the timing signals of curves E and K, it will be observed that the output of shift register 27 is that illustrated in curve N, FIG. 7. This corresponds to the output produced on the first conductor of conductors 14 of FIG. 1. To produce the output of the second conductor 14 of FIG. 1, the output of shift register 18 is coupled to AND circuit 29 which under control of timing pulse $P_2$ produces the output as illustrated in curve O, FIG. 5 and is coupled to OR gate 30. The output of shift register 23 is coupled to shift register 31 which under control of timing pulse $P_2$ produces the output illustrated in curve P, FIG. 5. The output of shift register 31 is coupled to AND gate 32 under control of timing pulse $P_3$ which will produce an output as illustrated in curve Q which is coupled to OR gate 30. The output of OR gate 30 is that illustrated in curve R, FIG. 5 and is coupled to shift register 33 which under control of the timing pulses $P_2$ and $P_3$ through means of OR gate 28 produces the output illustrated in curve S, FIG. 5.

Figure 5:
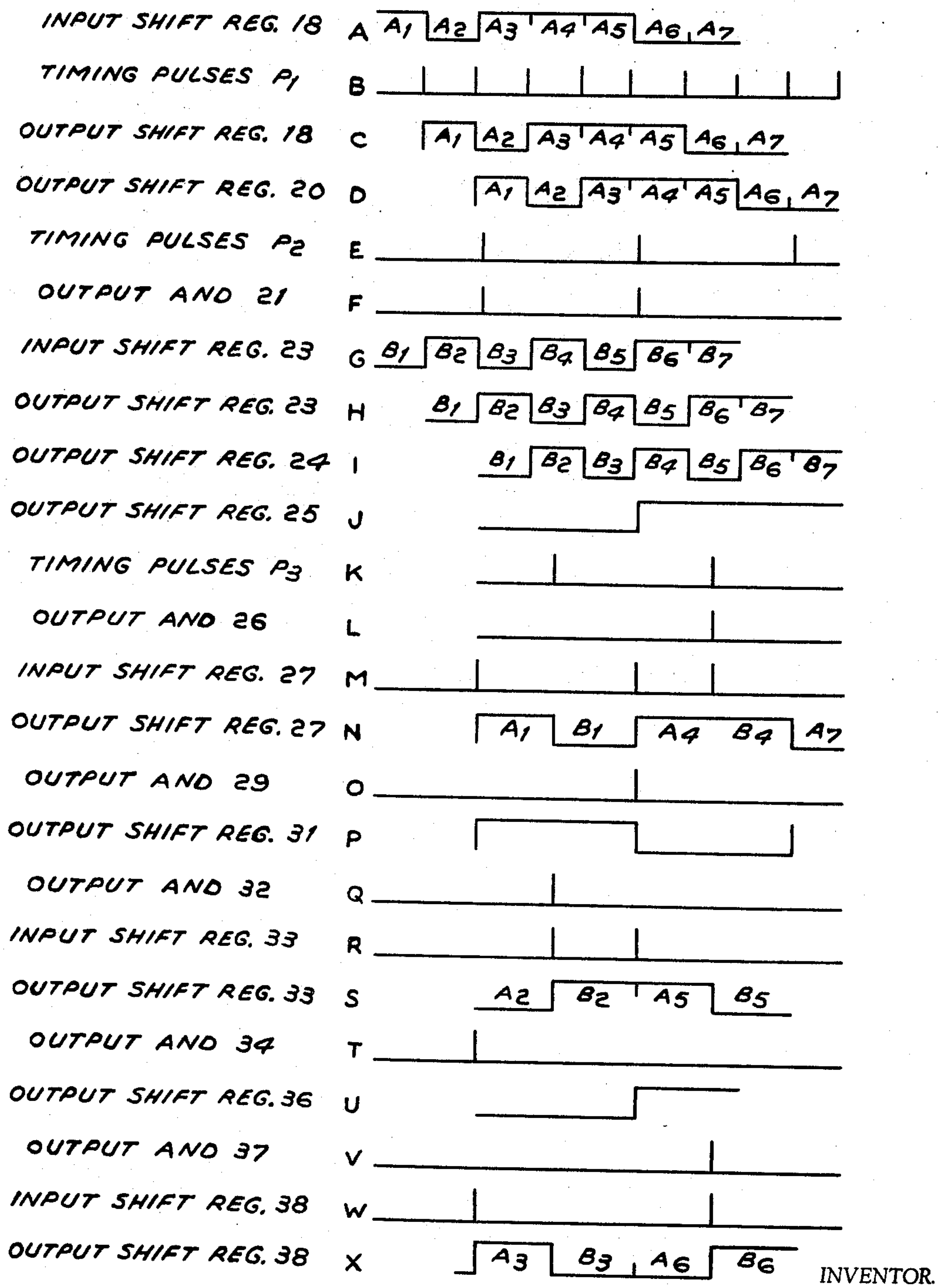
FIG. 5 is a series of curves useful in describing the operation of the transmitter of the system of this invention as illustrated in FIG. 4.

The signal on conductor 13*a* is coupled through AND gate 34 which under control of timing pulse $P_2$ produces the output as illustrated in curve T, FIG. 5 which is coupled to OR gate 35. The output from conductor 13*b* is coupled to shift register 36 which under control of timing pulse $P_2$ produces the output illustrated in curve U, FIG. 5. The output of shift register 36 is coupled to AND gate 37 which under control of timing pulse $P_3$ produces the output illustrated in curve V, FIG. 5 which is coupled to OR gate 35. The output of OR gate 35 is coupled to shift register 38 which under control of timing pulses $P_2$ and $P_3$ produces an output as illustrated in curve X, FIG. 5.

It will be observed that the outputs from shift registers 27, 33 and 38, as illustrated in curves N, S, and X of FIG. 5 are respectively identical to curves E, F and G of FIG. 3. Employing identical components operating in the same manner as described hereinabove coupled to conductors 13*c* and 13*d*, the equipment will produce the curves illustrated in H, I, and J of FIG. 3 at the outputs of shift registers 39, 40 and 41, respectively. The outputs of shift registers 27, 33, 38, 39, 40 and 41 are coupled to matrix 6 which includes therein a plurality of coincidence devices 42 so arranged in accordance with the example herein employed of M and M' that there are 16 outputs which can select any one of 16 frequencies and 4 outputs as controlled by the outputs of shift registers 40 and 41 in coincidence devices 43 to select the phase of the selected frequency.

Figure 4:
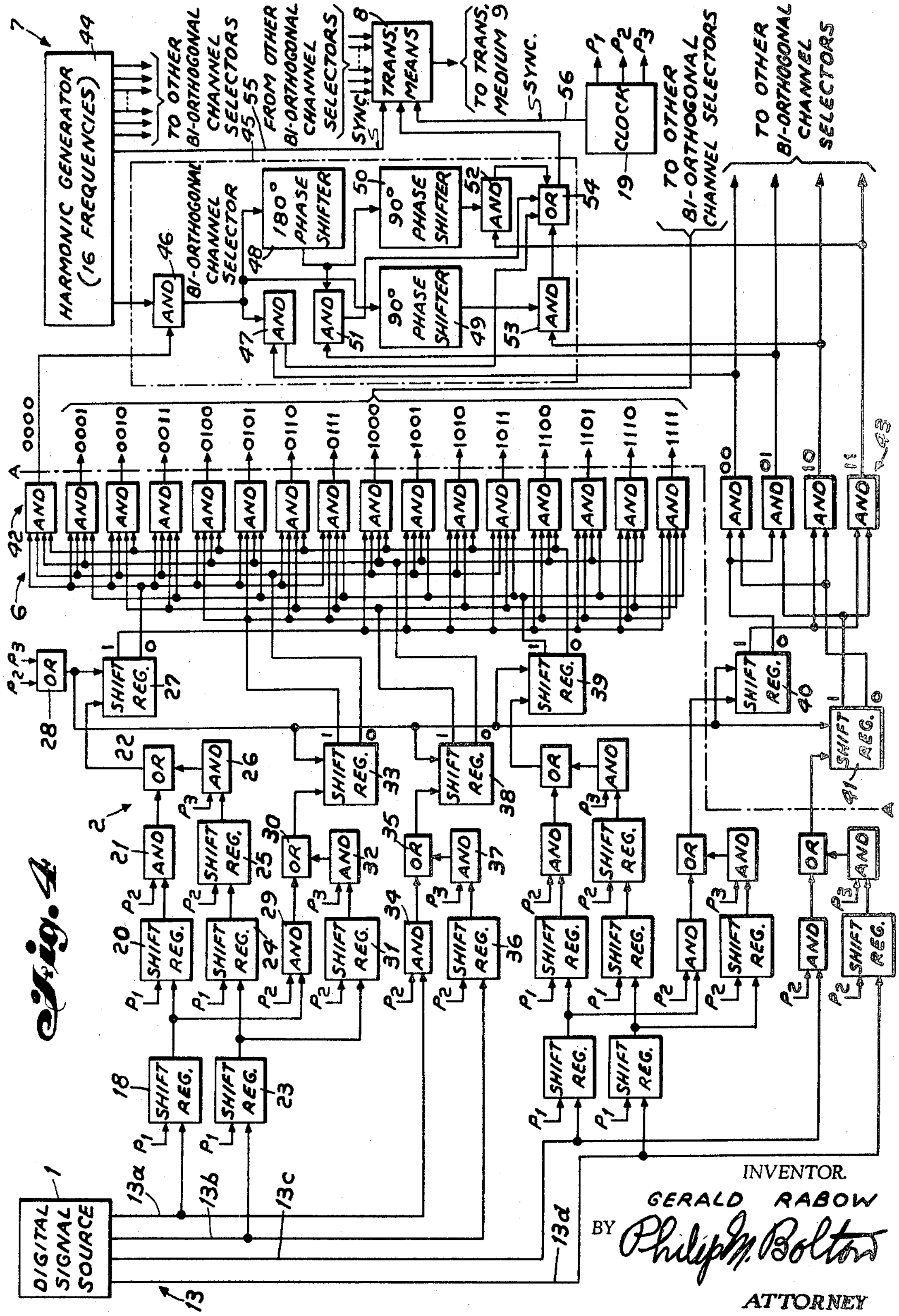
FIG. 4 is a schematic diagram in block form illustrating in more detail a non-limiting embodiment of the transmission portion of the system of FIG. 1.

Thus, matrix 6 under control of shift registers at the output of translator 2 will select any one of 16 frequencies and any one of four phases for the selected frequency. As illustrated in FIG. 4, one embodiment of the bi-orthogonal channels and selector 7, therefore, under control of matrix 6 includes a harmonic generator 44 which provides 16 frequencies. Each of the frequencies are coupled to a bi-orthogonal channel selector, such as selector 45, which includes an AND gate 46 coupled to any one of coincidence devices 42 as determined by the output of shift registers 27, 38, 29, 40 and 41. As illustrated, the input of AND gate 46 is coupled to the output of first coincidence device 42. The output of AND gate 46 is then split to be coupled to AND gate 47 and a 180° phase shifter 48 and a 90° phase shifter 49. The output of phase shifter 48 is also coupled to the input of a 90° phase shifter 50 and AND gate 51. The output of phase shifter 50 is coupled to an AND gate 52, and the output of phase shifter 49 is coupled to AND gate 53. The output of each of these AND gates 47, 51, 52 and 53 is coupled to an OR gate 54. The signal passed through OR gate 54 is determined by which of the AND gates 43 are activated by the shift registers 40 and 41. The output of OR gate 54 is coupled to the transmission means 8 along with the synchronizing signal on conductor 55 from generator 44 and a synchronizing signal on conductor 56 from clock 19. These signals are then coupled over medium 9 to receiving means 10.

Figure 6:
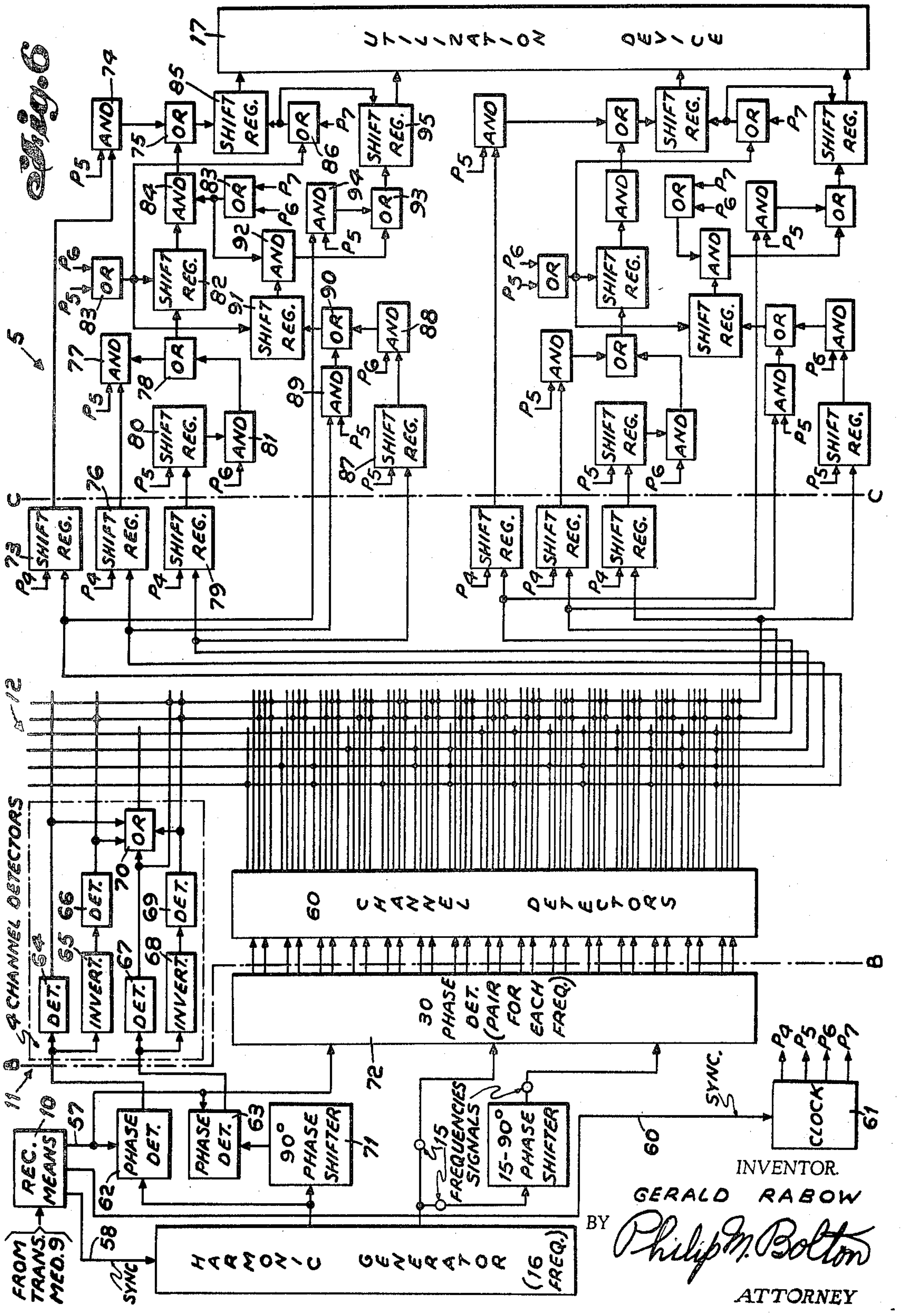
FIG. 6 is a schematic diagram in block form illustrating in greater detail a non-limiting embodiment of the receiving portion of the system of FIG. 1.

Referring to FIG. 6, there is illustrated therein in more detail the components employed in the receiving end of the communication system of this invention.

The output of receiving means 10 includes the bi-orthogonal channel signal containing the M' level amplitude digital signal on conductor 57, a synchronizing signal on conductor 58 to synchronize the frequency generated in the harmonic generator 59 to those generated in generator 44 and a synchronizing signal on conductor 60 to synchronize clock 61 to clock 19. The output on conductor 57 is coupled to the bi-orthogonal channel detectors or maximum likelihood detector 11 which includes therein for each of the four channels two phase detectors 62 and 63 and signal polarity detector including detector 64, inverter 65, detector 66, detector 67, inverter 68, detector 69, and OR gate 70. Phase detector 62 is coupled directly to one frequency at the output of generator 59 and phase detector 63 is coupled to a 90° phase shifter 71 to the same frequency output of generator 59. Thus, there is a pair of phase detectors for each frequency output of harmonic generator 59 as indicated in block 72. If there is maximum output of phase detector 62, it is known that the received signal is in phase with the reference signal and will be passed by detector 64 which will pass only positive signals. If, on the other hand, there should be a negative output from phase detector 62, it is known that the signal in phase detector 62 is 180° out of phase with the reference signal and would be passed by inverter 65 through detector 66. Phase detector 63 in the same manner determines whether the channel represented by the 90° or 270° phase of this frequency carries the M' level digital signal. If there is a positive output of phase detector 63, detector 67 will pass this signal to OR gate 70, while, on the other hand, a negative output, indicating a 270° phase relationship, will be passed through inverter 68 to detector 69 and, hence, to OR gate 70. The outputs of the channel detectors are coupled to matrix 12 having a configuration substantially as illustrated to provide the input for code translator 5. Matrix 12 in conjunction with the bi-orthogonal channel detectors determines which channel has the largest absolute output at the end of the 1½ unit time interval and presents this output in the form of the M' digital signal to the inputs 15 of translator 5. In the example under consideration, shift register 73 would receive the input of curve A, FIG. 7 which under control of timing pulses $P_4$, as shown in curve B, FIG. 7, will produce an output as illustrated in curve C, FIG. 7. The output of shift register 73 is coupled to AND gate 74 which under control of timing pulses $P_5$, curve D, FIG. 7, produces an output as illustrated in curve E, FIG. 7 for application to OR gate 75. Matrix 12 will couple to shift register 76 the waveform illustrated in curve F, FIG. 7 (curve F, FIG. 3). Register 76, under control of timing pulse $P_4$, will produce an output as illustrated in curve G, FIG. 7, for application to AND gate 77. Gate 77 under control of timing pulse $P_5$ will couple the input illustrated in curve H, FIG. 7 to OR gate 78. Shift register 79 receives the input illustrated in curve I, FIG. 7 (curve G, FIG. 3) which under control of timing pulse $P_4$ will produce the output illustrated in curve J, FIG. 7. The output of shift register 79 is coupled to shift register 80. Register 80 under the control of timing pulse $P_5$ will produce the output as illustrated in curve K, FIG. 7 for application to AND gate 81. AND gate 81 under control of timing pulses $P_6$ (curve L, FIG. 7) will produce an output illustrated in curve M, FIG. 7. The output of AND gate 81 is coupled to the OR gate 78 whose output is in turn coupled to shift register 82 which will have applied thereto the signals represented in curve N, FIG. 7. Shift register 82 which is controlled by timing pulses $P_5$ and $P_6$ through OR gate 83 will provide an output as illustrated in curve O, FIG. 7 for application to AND gate 84. AND gate 84 is controlled by the timing pulses $P_6$ and $P_7$ to provide an output as illustrated in curve Q, FIG. 7. The output of AND gate 84 is coupled through OR gate 75 whose output is in turn coupled to shift register 85 which has an input as illustrated in curve R, FIG. 7. Shift register 85 is under control of timing pulses $P_5$ and $P_6$ coupled through OR gate 83 and timing pulse $P_7$ coupled through OR gate 86 to produce an output as illustrated in curve S, FIG. 7. This curve is identical to curve A, FIG. 3.

Figure 7:
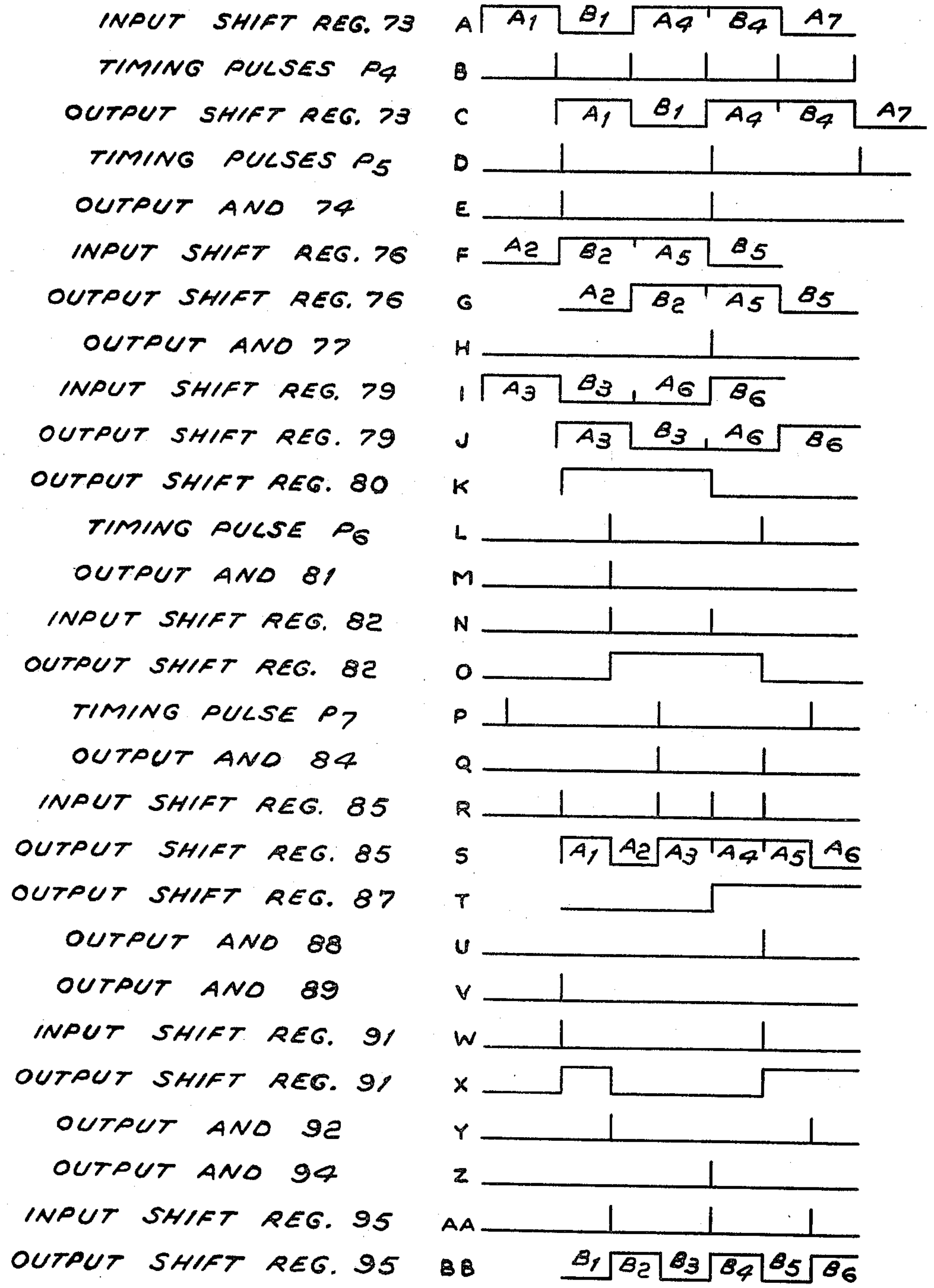
FIG. 7 is a series of curves useful in explaining the operation of the receiver of FIG. 6.

Shift register 87 receives the input as illustrated in curve I, FIG. 7 which when timed in accordance with timing pulse $P_5$ produces an output as illustrated in curve T, FIG. 7. This output is coupled to AND gate 88 which under control of timing pulse $P_6$ produces the output illustrated in curve U, FIG. 7. AND gate 89 receives the input of shift register 76, as illustrated in curve F, FIG. 7, and timing pulse $P_5$ to produce an output as illustrated in curve V, FIG. 7. The output of AND gates 88 and 89 are coupled to OR gate 90 for application to shift register 91. The input to shift register 91 is illustrated in curve W, FIG. 7 and provides an output under control of timing pulses $P_5$ and $P_6$ through OR gate 83 as illustrated in curve X, FIG. 7. The output of shift register 91 is coupled to AND gate 92. Gate 92 is under control of timing pulses $P_6$ and $P_7$ through OR gate 83' to provide the output as illustrated in curve Y, FIG. 7. The output of AND gate 92 is coupled to OR gate 93. The other input of OR gate 93 is coupled from AND gate 94. One input of AND gate 94 is the input to shift register 73 as illustrated in curve A, FIG. 7, and the other input to AND gate 94 is the timing pulse $P_5$ which produces an output as illustrated in curve Z, FIG. 7. The output of OR gate 93 provides an input to shift register 95 as illustrated in curve A—A, FIG. 7. The output of register 95, under control of timing pulses $P_5$ and $P_6$ from OR gate 83 and timing pulses $P_7$ from OR gate 86, is illustrated in curve B—B, FIG. 7 which is identical to curve B, FIG. 3.

The process and equipment and the operation thereof for producing the other two digit outputs of translator 5 are substantially similar to that described hereinabove for the first two outputs of translator 5 and, hence, further discussion thereof is not deemed necessary.

Figure 8:
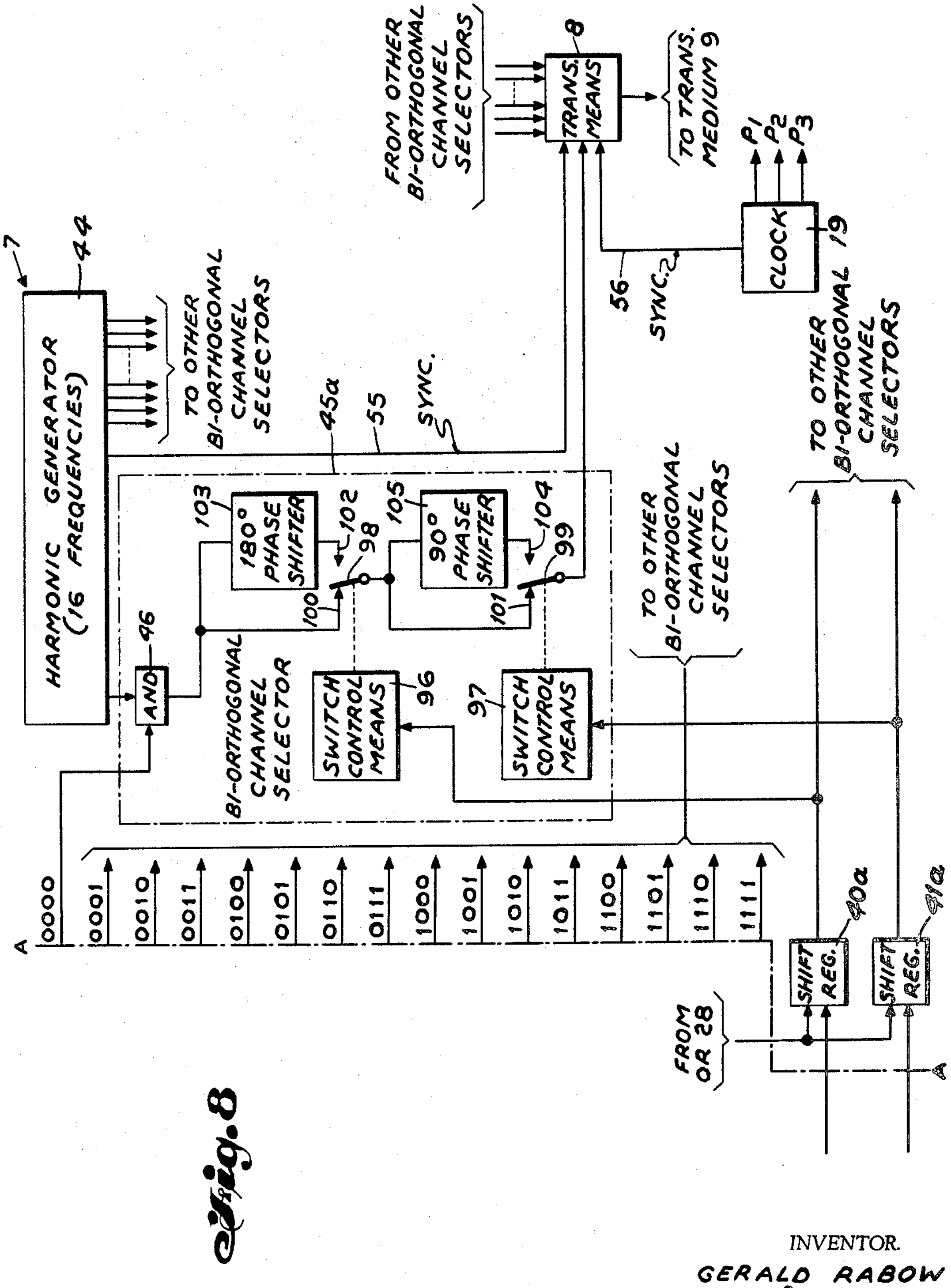
FIG. 8 is another embodiment of bi-orthogonal channels and selectors which may be substituted for the equipment disposed to the right of line A—A of FIG. 4.

Referring to FIG. 8, there is illustrated therein another form of bi-orthogonal channels and selectors thereof which cooperate with matrix 6 to enable the transmission of the M′ level signals from transmission means 8 to transmission medium 9. The components of FIG. 8 are substituted for the components of FIG. 4 disposed to the right of line A—A. The components of FIG. 8, which function the same as that described in connection with FIG. 4, have the same reference characters applied thereto. The following discussion will be concerned with only the specific difference between FIGS. 4 and 8.

Bi-orthogonal channel selector **45*a* includes an AND gate, such as AND gate 46, to select the frequency output from generator 44 in accordance with the appropriate output of AND gate 42 of FIG. 4. The selected frequency is then coupled to an arrangement to appropriately select the proper bi-orthogonal channel of the selected frequency in accordance with the output of shift register 40*a* and shift register 41*a*. Assuming that the outputs of shift registers 40*a* and 41*a* are the "1" output of these shift registers, when there is no output the switch control means 96 and 97, such as relays, are not activated and switches 98 and 99 are in the position illustrated, that is, in contact with contacts 100 and 101, respectively. Under these conditions with no output from both shift register 40*a* and 41*a*, the frequency output of AND gate 46 will be coupled directly to transmission means 8** without any phase shift imparted thereto, or in other words, will have a zero phase shift.

If there is an output from shift register **40*a*, switch control means 96 will operate to position switch 98 on contact 102. This will couple the frequency selected by AND gate 46 from 180° phase shifter 103 to contact 101, switch 97 and, hence, to transmission means 8**.

If both shift registers **40*a* and 41*a* have a "1" output, switch means 96 and 97 will both be activated which will move switch 98 to contact 102 imparting a 180° phase shift to the selected frequency in phase shifter 103 and switch 99 will be moved to contact 104 to couple the output of phase shifter 103 from phase shifter 105, resulting in the selected frequency being shifter 270° prior to coupling to transmission means 8**.

In the arrangement of channel selector 45, a 90° phase shift is imparted to the selected frequency prior to coupling to transmission means 8 when shift register **40*a* has a "0" output which will not activate switch control means 9 and leave switch 98 in contact with contact 100 while shift register 41*a* has a "1" output to activate switch control means 97 to position switch 99 in contact with contact 104**.

The above description with reference to channel selector **45*a* and shift registers 40*a* and 41*a* will act in the same manner as channel selector 45 under control of AND gates 42 and 43** to provide the bi-orthogonal frequency channels of the selected frequency.

Of course, other arrangements may be provided employing both outputs, the "1" output and the "0" output, of shift registers **40*a* and 41*a*. Under this condition, switch control means 96 and 97 could be relays of the polarity responsive type and switches 98 and 99 would have a rest position intermediate their associated contacts so that an output from the "1" output of the shift regisers 40*a* and 41*a* will pull the switch to one of the contacts, while the output from the "0" output of the shift registers 40*a* and 41**A will pull the switch to the other switch contacts.

It will be apparent from the above discussion that there are other ways of selecting the bi-orthogonal channel over which the M′ level signal can be selected and coupled to the transmission means for propagation along transmission medium 9. For instance, switches 98 and 99 and their associated contacts could be replaced by AND gates appropriately controlled by shift registers **40*a* and 41*a***.

It is immediately obvious that a reduction in components is achieved in the arrangement of FIG. 8 relative to the number of components employed in the arrangement of FIG. 4. Thus, the arrangement of FIG. 8 may be preferred over that of FIG. 4, but there may be specific circumstances where the arrangement of FIG. 4 is preferred over that of FIG. 8. Transistors or other electronic components could readily be substituted for switches 98 and 99.

Figure 9:
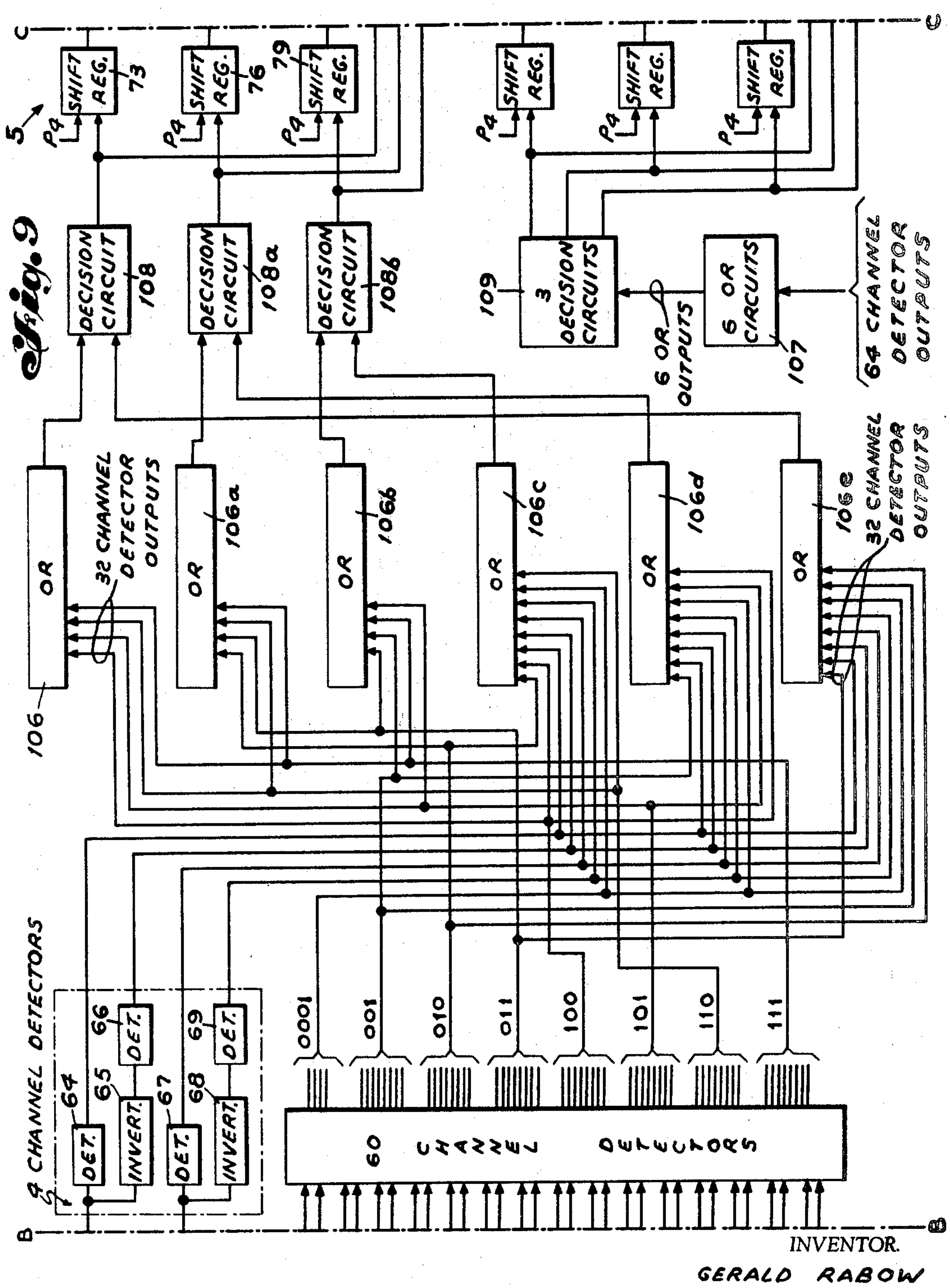
FIG. 9 is another embodiment of bi-orthogonal channel detectors and the matrix coupled thereto which may be substituted for the equipment disposed between lines B—B and C—C of FIG. 6.

Referring to FIG. 9, the components illustrated therein may be substituted for those components disposed between lines B—B and C—C of FIG. 6 to perform the same function as these components but resulting in a reduction of the complexity thereof.

The channel detectors incorporate substantially the same components and perform the same function as described in connection with FIG. 6 and are identified in FIG. 9 by the same reference characters as employed in the description of FIG. 6. The difference between the channel detectors in FIG. 9 and those employed in FIG. 6 is the elimination of the OR circuit 70 of FIG. 6. Thus, the outputs of detectors 64, 66, 67 and 69 are employed directly to determine which of the channels contain the M′ level signal.

As illustrated, the outputs of the channel detectors are coupled to OR circuits 106, **106*a*, 106*b*, 106*c*, 106*d* and 106*e* to determine which of the 64 channels might contain the M′ level signal. OR circuits 107 contain substantially a duplicate of the OR circuits 106, namely, 6 distinct OR circuits connected to the 64 channel detector outputs in a corresponding pattern to OR circuits 106**.

OR circuits 106 provide an output signal which is equal in amplitude to the largest input signal and in this way it is possible to determine in decision circuits 108, **108*a* and 108*b* the M′ level signal for application to their associated shift registers 73, 76 and 79**, respectively.

OR circuit 106 is coupled to the last 32 channel detector outputs to provide at the output thereof an output signal equal to the largest input signal which of necessity would be the channel carrying the M′ level signal. OR circuit **106*a* is coupled to the last 16 channel detector outputs and the 17th to 32nd channel detector outputs to determine in a like manner if the M′ level signal is contained in either of these channels. OR circuit 106*b* is connected to the last 8 channel detector outputs, the 41st to 48th, the 25th to 32nd, and the 9th to 16th channel detector outputs to determine if the M′ level signal is contained in any of these channels. OR circuit 106*c* is coupled to the first 8, the 17th to 24th, the 33rd to 40th, and the 49th to 56th channel detector outputs to determine if the M′ level signal is contained in any of these channels. OR circuit 106*d* is connected to the first 16 and the 33rd to 48th channel detector outputs to determine if the M′ level signal is contained in one of these channels. OR circuits 106*e*** is coupled to the first 32 channel detector outputs to determine if one of these channels contains the M′ level signal.

The output of OR circuit 106 and the output of OR circuit **106*e* are coupled to decision circuit 108, the output of OR circuit 106*a* and the output of OR circuit 106*d* are coupled to decision circuit 108*a*, while the outputs of OR circuit 106*b* and OR circuit 106*c* are coupled to decision circuit 108*b*. Each of these decision circuits in the manner in which they are connected to the OR circuits 106 will pass an output from that OR circuit containing the largest output signal which corresponds to the largest input signal and could take the form of an OR circuit similar to those OR circuits 106**.

The six OR circuits 107 are connected in a corresponding manner and the outputs of these OR circuits are coupled to three decision circuits 109 which are connected to the corresponding OR circuits in a manner similar to that of decision circuits 108 with the outputs from these decision circuits 109 being coupled to their associated shift registers of code translator 5.

As pointed out hereinabove, OR circuits 106 and 107, are of the type that provide an output equal to the largest input and in the application in which they are employed in the communication system of this invention, the largest input would be that input containing the M′ level signal and, hence, the output of the OR circuit detecting this largest input signal would provide the M′ level signal. The operation of the OR circuit to provide a maximum output circuit to detect one of 64 channels carrying the M′ level signal finds basis in the textbook by Millman and Taub, "Pulse and Digital Circuits," page 395, wherein the statement is made that if the input pulses to the OR circuits are unequal at the same instant of time, the output pulse will be of an amplitude equal to the amplitude of the largest input pulse. Thus, the OR circuits 106 and 107 and their associated decision circuits 108 and 109 will provide the M′ level signal for application to the shift registers of translator 5, since only one of the 64 channels at one instant of time will have the largest signal amplitude which is, of course, the M′ level signal at that instant.

In summary, the transmission system of this invention consists of translating an M level digital signal to an M′ level digital signal, transmitting the M′ level digital signal over one of M′ bi-orthogonal frequency channels, deciding on which channel has the signal by maximum likelihood detection (which channel has the largest output). Bi-orthogonal channels (positive or negative polarity in orthogonal channels) are desirable because they minimize the probability of changing one signal into another signal for a given signal-to-noise ratio. The number M′ is chosen to provide the specified output signal-to-noise ratio and simultaneously to have the transmission occupy the allotted bandwidth.

The coding scheme employed in the communication system of this invention gives good performances relative to the theoretical limits (for $B>\frac{1}{2}\log_2 M$) without the use of long code sequences. For special cases the coding scheme of the communication system of this invention reduces to digital frequency modulation, pulse code modulation or digital amplitude modulation.

For parameters for which the proposed coding scheme comes out with a code other than the conventional modulation schemes mentioned above, the proposed coding scheme requires less power to achieve the required output signal-to-noise while staying within the allotted bandwidth. The difference in required power between conventional pulse code modulation system and the coding arrangement of the communication system of this invention can be approximated as the distance between the $n=2$ and $n=\log_2 M'$ in the $E_{M'}$ vs. Q plots at the $E_{M'}$ of interest in FIG. 6 of the A. J. Viterbi reference above cited. Similarly, the improvement of the coding scheme of this invention over a conventional digital frequency modulation system, for $M\leqslant 4B$, is the difference between the $n=\log M$ and $n=\log M'$ curves in the reference above referred to. For $M>4B$, the relative improvement contains a term $M/4B$ which overshadows logarithm terms.

The proposed coding arrangement of the communication system of this invention, as described hereinabove, gives a performance standard against which other known coding systems may be compared. In thus evaluating an analog FM system, it should first be converted to an equivalent sampled FM system (at approximately twice the highest frequency of interest). Each sample can then be considered to consist of M levels. Conventional FM discriminators, whether or not the frequency feedback type, are in general less efficient than maximum likelihood detectors and, hence, any such system would require greater transmitter power for the same performance.

The above formulas for the communication system of this invention have been derived for minimum $P_c$ as a function of $P_o$ and B. Alternatively, it would be possible to determine a communication system for minimum B as a function as $P_o$ and $P_c$, or for maximum $P_o$ as a function of $P_c$ and B.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system having a given transmission bandwith comprising:

a source of first signals representing M possible amplitude levels having a given information bandwidth, where M equals an integer greater than one, each of said first signals having a given time duration;

first means coupled to said source to translate M level signals to second signals representing M′ possible amplitude levels having an information bandwidth adjusted to fully occupy said given transmission bandwith, where M′ equals an integer greater than one having a value different than the value of M, each of said second signals having a time duration different from said given time duration;

second means coupled to said first means to transmit said M′ level signals;

third means coupled to said second means to detect said M′ level signals; and fourth means coupled to said third means to translate said M′ level signals to said M level signals.

2. A communication system having a given transmission bandwith comprising:

a source of first digital signals representing M possible amplitude levels having a given information bandwith, where M equals an integer greater than one, each bit of said first digital signals having a given time duration;

first means coupled to said source to translate M level digital signals to second digital signals representing M′ possible amplitude levels, where M′ equals an integer greater than one having a value different than the value of M, the value of M′ being chosen to provide a specified output signal-to-noise ratio and to adjust said information bandwidth to fully occupy said given transmission bandwidth, each bit of said second digital signals having a time duration different from said given time duration;

second means coupled to said first means to transmit said M′ level digital signals;

third means coupled to said second means to detect said M′ level digital signals; and fourth means coupled to said third means to translate said M′ level digital signals to said M level digital signals.

3. A communication system having a given transmission bandwith comprising:

a source of digital signals representing M possible amplitude levels having a given information bandwidth, where M equals an integer greater than one;

first means coupled to said source to translate M level digital signals to digital signals representing M′ possible amplitude levels, where M′ equals an integer greater than one having a value different than the value of M, the value of M′ being chosen to provide a specified output signal-to-noise ratio and to adjust said information bandwidth to fully occupy said given transmission bandwidth;

second means coupled to said first means to transmit said M' level digital signals;

third means coupled to said second means to detect said M' level digital signals; and fourth means coupled to said third means to translate said M' level digital signals to said M level digital signals;

said second means including means to transmit a different predetermined signal representing each of said M' level digital signals over a different one of a predetermined plurality of channels.

4. A communication system having a given transmission bandwith comprising:

a source of digital signals representing M possible amplitude levels having a given information bandwidth, where M equals an integer greater than one;

first means coupled to said source to translate M level digital signals to digital signals representing M' possible amplitude levels, where M' equals an integer greater than one having a value different than the value of M, the value of M' being chosen to provide a specified output signal-to-noise ratio and to adjust said information bandwidth to fully occupy said given transmission bandwidth;

second means coupled to said first means to transmit said M' level digital signals;

third means coupled to said second means to detect said M' level digital signals; and fourth means coupled to said third means to translate said M' level digital signals to said M level digital signals;

said second means including means to transmit a different predetermined signal representing each of said M' level digital signals over a different one of a predetermined plurality of channels; and said third means including means for receiving said plurality of channels.

5. A communication system having a given transmission bandwidth comprising:

a source of first signals representing M possible amplitude levels having a given information bandwidth less than said given transmission bandwidth, where M equals an integer greater than one, each of said first signals having a given time duration;

first means coupled to said source to translate M level signals to second signals representing M' possible amplitude levels having an information bandwidth expanded to fully occupy said given transmission bandwidth, where M' equals an integer greater than one having a value different than the value of M, each of said second signals having a time duration greater than said given time duration;

second means coupled to said first means to transmit said M' level signals;

third means coupled to said second means to detect said M' level signals; and fourth means coupled to said third means to translate said M' level signals to said M level signals.

6. A communication system having a given transmission bandwidth comprising:

a source of first digital signals representing M possible amplitude levels having a given information bandwidth less than said given transmission bandwidth, where M equals an integer greater than one, each bit of said first digital signals having a given time duration;

first means coupled to said source to translate said M level digital signals to second digital signals representing M' possible amplitude levels, where M' equals an integer greater than one having a value different than the value of M, the value of M' being chosen to provide a specified output signal-to-noise ratio and to expand said information bandwidth to fully occupy said given transmission bandwidth, each bit of said second digital signals having a time duration greater than said given time duration;

second means coupled to said first means to transmit said M' level digital signals;

third means coupled to said second means to detect said M' level digital signals; and fourth means coupled to said third means to translate said M' level digital signals to said M level digital signals.

7. A communication system having a given transmission bandwidth comprising:

a source of digital signals representing M possible amplitude levels having a given information bandwidth less than said given transmission bandwidth, where M equals an integer greater than one;

first means coupled to said source to translate said M level digital signals to digital signals representing M' possible amplitude levels, where M' equals an integer greater than one having a value different than the value of M, the value of M' being chosen to provide a specified output signal-to-noise ratio and to expand said information bandwidth to fully occupy said given transmission bandwidth;

second means coupled to said first means to transmit said M' level digital signals;

third means coupled to said second means to detect said M' level digital signals; and fourth means coupled to said third means to translate said M' level digital signals to said M level digital signals;

said second means including means to transmit a different predetermined signal representing each of said M' level digital signals over a different one of a predetermined plurality of frequency channels.

8. A communication system having a given transmission bandwidth comprising:

a source of digital signals representing M possible amplitude levels having a given information bandwith less than said given transmission bandwidth, where M equals an integer greater than one;

first means coupled to said source to translate said M level digital signals to digital signals representing M' possible amplitude levels, where M' equals an integer greater than one having a value different than the value of M, the value of M' being chosen to provide a specified output signal-to-noise ratio and to expand said information bandwidth to fully occupy said given transmission bandwidth;

second means coupled to said first means to transmit said M' level digital signals;

third means coupled to said second means to detect said M' level digital signals; and fourth means coupled to said third means to translate said M' level digital signals to said M level digital signals;

said second means including means to transmit a different predetermined signal representing each of said M' level digital signals over a different one of M' bi-orthogonal frequency channels.

9. A communication system having a given transmission bandwidth comprising:

a source of digital signals representing M possible amplitude levels having a given information bandwidth less than said given transmission bandwidth, where M equals an integer greater than one;

first means coupled to said source to translate said M level digital signals to digital signals representing M' possible amplitude levels, where M' equals an integer greater than one having a value different than the value of M, the value of M' being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said second means including
means to produce M different frequencies, means coupled to said means to produce to provide each of said different frequencies with a plurality of different phases to generate M′ bi-orthogonal frequency channels, and
means coupled to said means to generate responsive to said M′ level digital signal to select one of said frequency channels to transmit a predetermined signal representing said M′ level digital signal.

10. A communication system having a given transmission bandwidth comprising:
a source of digital signals representing M possible amplitude levels having a given information bandwidth less than said given transmission bandwidth, where M equals an integer greater than one;
first means coupled to said source to translate said M level digital signals to digital signals representing M′ possible amplitude levels, where M′ equals an integer greater than one having a value different than the value of M, the value of M′ being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said third means including
means for receiving a predetermined plurality of frequency channels, and
means coupled to said means for receiving to decide which of said frequency channels contains a predetermined signal representing said M′ level digital signals.

11. A system according to claim 8, wherein
said third means includes
means for receiving M′ bi-orthogonal frequency channels, and
means coupled to said means for receiving to decide which of said frequency channels contains a predetermined signal representing said M′ level digital signals.

12. A system according to claim 8, wherein
said third means includes
means for receiving M′ bi-orthogonal frequency channels, and
maximum likelihood detection means coupled to said means for receiving to decide which of said frequency channels contains a predetermined signal representing said M′ level digital signals.

13. A system according to claim 12, wherein
said maximum likelihood detection means includes
a source of M different frequencies,
means coupled to said source of different frequencies to shift the phase of each of said frequencies a predetermined amount to provide $M'/2$ different reference signals,
synchronous detector means coupled to each of said reference signals and said means for receiving,
means coupled to said synchronous detector means to determine which one thereof includes a maximum signal strength output and what the polarity thereof is to detect the channel carrying said M′ level digital signals, and
means coupled to said means to determine to couple said detected M′ level digital signals to said fourth means.

14. A communication system having a given transmission bandwidth comprising:
a source of digital signals representing M possible amplitude levels having a given information bandwidth less than said given transmission bandwidth, where M equals an integer greater than one;
first means coupled to said source to translate said M level digital signals to digital signals representing M′ possible amplitude levels, where M′ equals an integer greater than one having a value different than the value of M, the value of M′ being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said M level digital signal being a 16 level digital signal having four digits and a conductor for each of said digits coupled in parallel to the input of said first means;
said M′ level digital signal being a 64 level digital signal having six digits and a conductor for each of said digits coupled in parallel to the output of said first means, and
said first means including
six shift registers, one coupled to each digit conductor of said 64 level digital signal,
means to read the first digit of the first two digit conductors of said 16 level digital signals in sequence into the first of said six shift registers in a given time interval,
means to read the second digit on the first two digit conductors of said 16 level digital signal in sequence into the second of said six shift registers in said given time interval,
means to read the third digit on the first two digit conductors of said 16 level digital signals in sequence into the third of said six shift registers in said given time interval,
means to read the first digit on the third and fourth digit conductors of said 16 level digital signals in sequence into the fourth of said six shift registers in said given time interval,
means to read the second digit on the third and fourth digit conductors of said 16 level digital signals in sequence into the fifth of said six shift registers in said given time interval, and
means to read the second digit on the third and fourth digit conductors of said 16 level digital signals in sequence into the sixth of said six shift registers in said given time interval;
said given time interval being equivalent to the time necessary for said 64 level digital signal to fully occupy said given transmission bandwidth.

15. A system according to claim 14, wherein
said second means includes
64 bi-orthogonal channels, and
means responsive to the time coincidental ones of the pulses of said six shift registers to select one of said bi-orthogonal channels to transmit a predetermined signal representing said 64 level digital signals.

16. A communication system having a given transmission bandwidth comprising:
a source of digital signals representing M possible amplitude levels having a given information bandwidth less than said given transmission bandwidth, where M equals an integer greater than one;
first means coupled to said source to translate said M level digital signals to digital signals representing M′ possible ampliture levels, where M′ equals an integer greater than one having a value different than the value of M, the value of M′ being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said M′ level digital signal being a 64 level digital signal having 6 digits and a conductor for each of said digits coupled in parallel to the input of said fourth means;
said M level digital signal bieng a 16 level digital signal having 4 digits and a conductor for each of said digits coupled in parallel to the output of said fourth means; and
said fourth means including
four shift registers, one coupled to each digit conductor of said 16 level digital signal,
means to read the odd digits on the first three digit conductors of said 64 level digital signals sequentially into the first of said four shift registers in a time interval equivalent to the reciprocal of said information bandwidth;
means to read the even digits on the first three digit conductors of said 64 level digital signals sequentially into the second of said four shift registers in a time interval equivalent to the reciprocal of said information bandwidth,
means to read the odd digits on the last three digit conductors of said 64 level digital signals sequentially into the third of said four shift registers in a time interval equivalent to the reciprocal of said information bandwidth; and
means to read the even digits on the last three digit conductors of said 64 level digital signals sequentially into the fourth of said four shift registers in a time interval equivalent to the reciprocal of said information bandwidth.

17. A communication system having a given transmission bandwidth comprising:
a source of digital signals representing M possible amplitude levels having a given information bandwidth less than said given transmission bandwidth, where M equals an integer greater than one;
first means coupled to said source to translate said M level digital signals to digital signals representing M′ possible amplitude levels, where M′ equals an integer greater than one having a value different than the value of M, the value of M′ being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said second means including
means to transmit a different predetermined signal representing each of said M′ level digital signals over a different one of M′ bi-orthogonal frequency channels; and
said third means including
means for receiving M′ bi-orthogonal frequency channels.

18. A communication system having a given transmission bandwidth comprising:
a source of digital signals representing M possible amplitude levels having a given information bandwidth less than said given transmission bandwidth, where M equals an integer greater than one;
first means coupled to said source to translate said M level digital signals to digital signals representing M′ possible amplitude levels, where M′ equals an integer greater than one having a value different than the value of M, the value of M′ being chosen to provide a specified output signal-to-noise ratio and to expand said information bandwidth to fully occupy said given transmission bandwidth;
second means coupled to said first means to transmit said M′ level digital signals;
third means coupled to said second means to detect said M′ level digital signals; and
fourth means coupled to said third means to translate said M′ level digital signals to said M level digital signals;
said second means including
means to produce M different frequencies,
means coupled to said means to produce to provide each of said different frequencies with a plurality of different phases to generate M′ bi-orthogonal frequency channels, and
means coupled to said means to generate responsive to said M′ level digital signal to select one of said frequency channels to transmit a predetermined signal representing said M′ level digital signal;
said third means including
means for receiving M′ bi-orthogonal frequency channels, and
maximum likelihood detection means coupled to said means for receiving to detect the predetermined signal of said selected one of said frequeny channels.

19. A system according to claim 18, wherein
said maximum likelihood detection means includes
a source of M different frequencies,
means coupled to said source of different frequencies to shift the phase of each of said different frequencies a predetermined amount to provide $M'/2$ different reference signals,
synchronous detector means coupled to each of said reference signals and said means for receiving,
means coupled to said synchronous detector means to determine which one thereof includes maximum signal strength output and what the polarity thereof is to detect the channel carrying the predetermined signal representing said M′ level digital signals, and
means coupled to said means to determine to couple said detected predetermined signal to said fourth means.

20. In a communication system having a given transmission bandwidth, a transmitter comprising:
a source of first digital signals representing M possible amplitude levels having a given information bandwidth, where M equals an integer greater than one, each bit of said first digital signals having a given time duration,
first means coupled to said source to translate said M level digital signals to second digital signals representing M′ possible amplitude levels where M′ equals an integer greater than one having a value different than the value of M, the value of M' being chosen to provide a specified output signal-to-noise ratio and to adjust said information bandwidth to fully occupy said given transmission bandwidth, each bit of said second digital signals having a time duration different from said given time duration; and second means coupled to said first means to transmit said M' level digital signals.

21. In a communication system having a given transmission bandwidth, a transmitter comprising:

a source of digital signals representing M possible amplitude levels having a given information bandwidth, where M equals an integer greater than one;

first means coupled to said source to translate said M level digital signals to digital signals representing M' possible amplitude levels, where M' equals an integer greater than one having a value different than the value of M, the value of M' being chosen to provide a specified output signal-to-noise ratio and to adjust said information bandwidth to fully occupy said given transmission bandwidth; and second means coupled to said first means to transmit said M' level digital signals;

said second means including means to transmit a predetermined signal representing each of said M' level digital signals over a different one of a predetermined plurality of channels.

22. In a communication system having a given transmission bandwidth, a transmitter comprising:

a source of digital signals representing M possible amplitude levels having a given information bandwidth, where M equals an integer greater than one;

first means coupled to said source to translate said M level digital signals to digital signals representing M' possible amplitude levels, where M' equals an integer greater than one having a value different than the value of M, the value of M' being chosen to provide a specified output signal-to-noise ratio and to adjust said information bandwidth to fully occupy said given transmission bandwidth; and second means coupled to said first means to transmit said M' level digital signals;

said second means including means to produce M different frequencies, means coupled to said means to produce to provide each of said different frequencies with a plurality of different phases to generate M' bi-orthogonal frequency channels, and means coupled to said means to generate responsive to said M' level digital signal to select one of said frequency channels to transmit a predetermined signal representing said M' level digital signal.

23. In a communication system having a given transmission bandwidth, a receiver comprising:

first means to receive M' plurality of channels, one of which includes a predetermined signal representing one of a plurality of M' level digital signals having a bandwidth occupying said given transmission bandwidth; and second means coupled to said first means to translate the predetermined signal representing said M' level digital signal to an M' level digital signal having an information bandwidth different than said given transmission bandwidth, where M equals an integer greater than one and M' equals an integer greater than one having a value different than the value of M.

24. A system according to claim 23, wherein said first means includes maximum likelihood detection means coupled to said means for receiving to decide which of said channels contains the predetermined signal representing said M' level digital signal.

References Cited

UNITED STATES PATENTS

| | | | |
|---|---|---|---|
| 2,905,812 | 9/1959 | Doelz et al. | 325—39 X |
| 2,977,416 | 3/1961 | Robin | 178—66 X |
| 3,030,614 | 4/1962 | Lehan | 179—15 |
| 3,036,157 | 5/1962 | Franco et al. | 178—67 |

ROBERT L. GRIFFIN, *Primary Examiner.*

J. T. STRATMAN, *Assistant Examiner.*